(12) United States Patent
Brisebois et al.

(10) Patent No.: US 9,906,419 B1
(45) Date of Patent: Feb. 27, 2018

(54) SYSTEM AND METHOD FOR DISCOVERING AND EXPOSING CONTROLLING-USER NETWORKS

(71) Applicant: Dell Software Inc., Aliso Viejo, CA (US)

(72) Inventors: Michel Albert Brisebois, Renfrew (CA); Mikhail Anatolievich Plavskiy, Sankt-Peterburg (RU)

(73) Assignee: Quest Software Inc., Aliso Viejo, CA (US)

( * ) Notice: Subject to any disclaimer, the term of this patent is extended or adjusted under 35 U.S.C. 154(b) by 134 days.

(21) Appl. No.: 14/193,194

(22) Filed: Feb. 28, 2014

(51) Int. Cl.
*G06F 15/173* (2006.01)
*H04L 12/26* (2006.01)
*H04L 29/08* (2006.01)

(52) U.S. Cl.
CPC .............. *H04L 43/04* (2013.01); *H04L 67/10* (2013.01)

(58) Field of Classification Search
CPC ............. G06F 17/2247; G06F 17/3089; G06F 17/30029; G06Q 50/01
See application file for complete search history.

(56) References Cited

U.S. PATENT DOCUMENTS

| | | | |
|---|---|---|---|
| 8,561,153 B2 | 10/2013 | Grason et al. | |
| 2002/0026592 A1* | 2/2002 | Gavrila | G06F 21/6218 726/6 |
| 2013/0029641 A1* | 1/2013 | Hickie | G06F 21/604 455/411 |
| 2013/0275429 A1* | 10/2013 | York | G06F 17/30029 707/737 |
| 2013/0312084 A1* | 11/2013 | Tandon | G06F 21/00 726/17 |
| 2014/0201643 A1 | 7/2014 | Brisebois et al. | |

OTHER PUBLICATIONS

Sharepoint Snapple, "Managing and Identifying SharePoint Site Owners," http://sharepointsnapple.com, posted on Mar. 10, 2012, 4 pages.
"Site Administrator for SharePoint: Central SharePoint Permissions Management, Usage Reporting & Policy Management," http://software.dell.com/products/site-administrator-for-sharepoint/, 2014, 3 pages.

* cited by examiner

*Primary Examiner* — Hua Fan
(74) *Attorney, Agent, or Firm* — Winstead PC

(57) ABSTRACT

In one embodiment, a method is performed by a computer system comprising physical computer hardware. The method includes discovering a controlling-user network for at least one user. The controlling-user network comprising a plurality of controlling users. The plurality of controlling users each control one or more sites of a content-management system. The method further includes profiling the plurality of controlling users based, at least in part, on information gleaned from sites on the content-management system controlled by the plurality of controlling users. In addition, the method includes exposing the controlling-user network to the at least one controlling user using a result of the profiling.

16 Claims, 9 Drawing Sheets

| Owner Name | Match | |
|---|---|---|
| Owner 1 | 90% | Details |
| Owner 2 | 90% | Details |
| Owner 3 | 75% | Details |
| Owner 4 | 60% | Details |
| Owner x | 20% | Details |

FIG. 9

SYSTEM AND METHOD FOR DISCOVERING AND EXPOSING CONTROLLING-USER NETWORKS

BACKGROUND

Technical Field

The present disclosure relates generally to data analysis and more particularly, but not by way of limitation, to systems and methods for discovering and exposing controlling-user networks.

History of Related Art

Content-management systems often allow publishing, editing, modifying, and/or maintenance of content from a central interface. The content can be exposed, for example, on sites that are accessible via a uniform resource locator (URL). Content-management systems, however, do not typically provide an adequate mechanism for users responsible for the sites to collaborate.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system comprising physical computer hardware. The method includes discovering a controlling-user network for at least one user. The controlling-user network comprising a plurality of controlling users. The plurality of controlling users each control one or more sites of a content-management system. The method further includes profiling the plurality of controlling users based, at least in part, on information gleaned from sites on the content-management system controlled by the plurality of controlling users. In addition, the method includes exposing the controlling-user network to the at least one controlling user using a result of the profiling.

In one embodiment, an information handling system includes a processing unit, wherein the processing unit is operable to implement a method. The method includes discovering a controlling-user network for at least one user. The controlling-user network comprising a plurality of controlling users. The plurality of controlling users each control one or more sites of a content-management system. The method further includes profiling the plurality of controlling users based, at least in part, on information gleaned from sites on the content-management system controlled by the plurality of controlling users. In addition, the method includes exposing the controlling-user network to the at least one controlling user using a result of the profiling.

In one embodiment, a computer-program product includes a non-transitory computer-usable medium having computer-readable program code embodied therein. The computer-readable program code is adapted to be executed to implement a method. The method includes discovering a controlling-user network for at least one user. The controlling-user network comprising a plurality of controlling users. The plurality of controlling users each control one or more sites of a content-management system. The method further includes profiling the plurality of controlling users based, at least in part, on information gleaned from sites on the content-management system controlled by the plurality of controlling users. In addition, the method includes exposing the controlling-user network to the at least one controlling user using a result of the profiling.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 9 illustrates an example of a search-results interface.

DETAILED DESCRIPTION OF ILLUSTRATIVE EMBODIMENTS OF THE INVENTION

Figure 1:
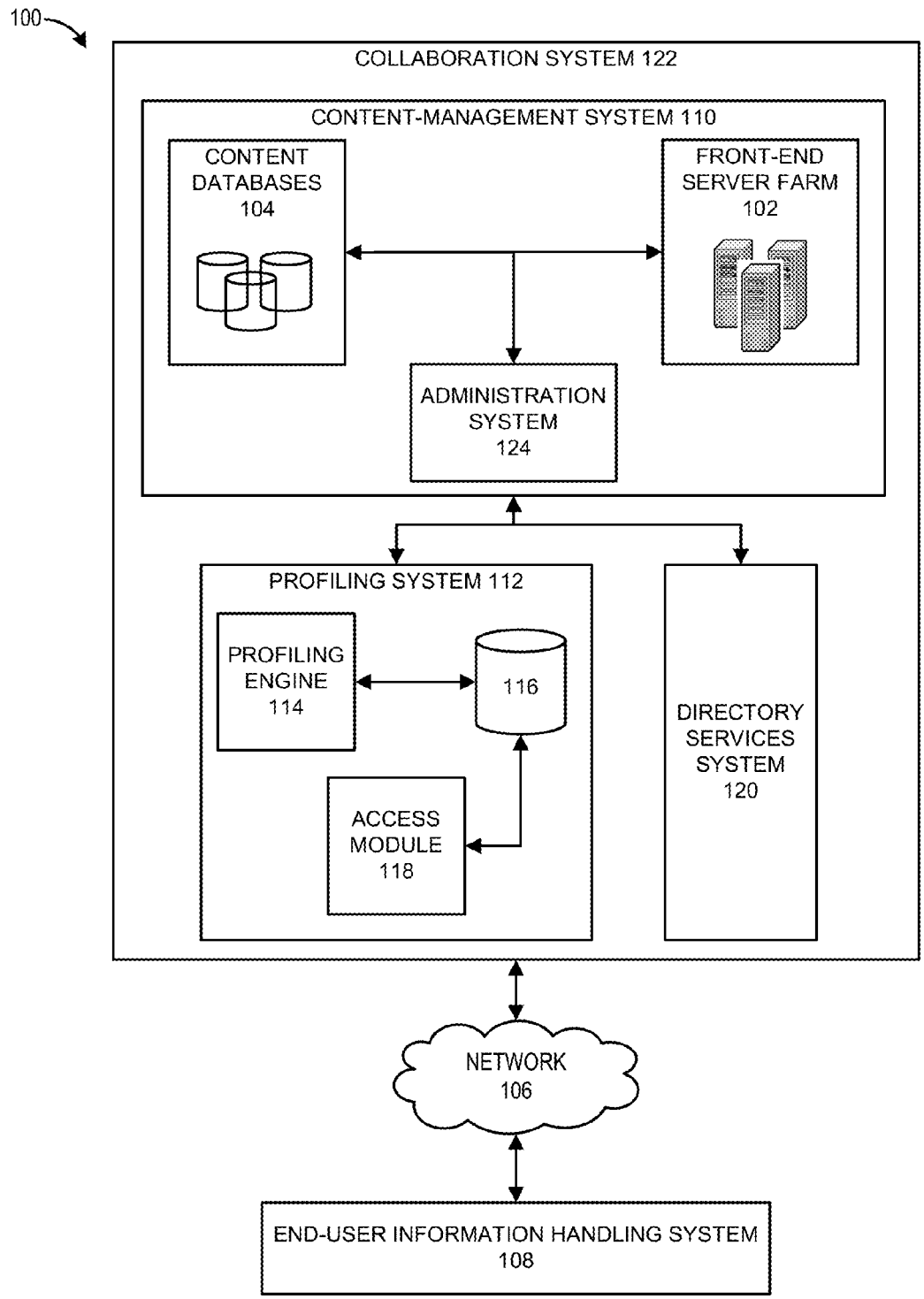
FIG. 1 illustrates a system for facilitating interaction among controlling users of sites managed by a content-management system.

Various embodiments described herein can facilitate establishment of controlling-user networks for users of a content-management system. The content-management system can be a system that allows publishing, editing, modifying, and/or maintaining of content from a central interface. In some embodiments, the content-management system can based on MICROSOFT SHAREPOINT. In general, a controlling-user network can include one or more users who are controlling users of at least one site managed by the content-management system. In addition to having its ordinary meaning, a controlling user can refer to a user who is primarily responsible for a managed site on the content-management system. For example, in a MICROSOFT SHAREPOINT implementation, a controlling user may be referred to as a site owner.

As described in greater detail below, the controlling users who are included in a particular user's controlling-user network can be discovered based, at least in part, on the particular user's permissions on the content-management system. In certain embodiments, the controlling users on the content-management system can also be profiled. For example, each controlling user can be profiled based, at least in part, on the content of the controlling user's sites, the controlling user's activities on the content-management system, other users' activities on the controlling user's sites, configurations and infrastructure of the controlling user's sites, directory-services information for the controlling user, and/or the like. The controlling-user network can also be exposed to the particular user. For example, in various embodiments, the particular user can be allowed to identify and connect with controlling users that meet particular search criteria.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates a system 100 for facilitating interaction among controlling users of sites managed by a content-management system. As shown, the system 100 can include a collaboration system 122 and end-user information handling systems 108 operated by users of the collaboration system 122. The collaboration system 122 can communicate with the end-user information handling systems 108 over a communications network 106. The communications network 106 can represent, for example, all or a portion of the Internet, a public or private intranet, and/or the like.

The collaboration system 122 includes a content-management system 110, a profiling system 112, and a directory-services system 120. The content-management system 110 includes a front-end server farm 102, one or more content databases 104, and an administration system 124. The one or more content databases 104 can store content for the content-management system 110. In general, the front-end server farm 102 corresponds to an end-user-facing portion of the content-management system 110 and is operable to serve sites (e.g., websites) containing content from the one or more content databases 104 over the communications network 106 to the end-user information handling systems 108.

The administration system 124 can be representative of hardware and/or software modules that provide information related to users and/or content of the content-management system 110.

The front-end server farm 102 can include any number of physical or virtual server computers. In many cases, the front-end server farm 102 can be representative of a plurality of front-end server farms that are each responsible for one or more content databases such as the one or more content databases 104. In addition, it should be appreciated that that the content-management system 110 may also include additional servers and databases to perform, for example, back-end functionality (i.e., functionality that is not end-user facing).

The directory-services system 120 can include hardware and/or software that stores, organizes and provides access to information about users of the content-management system 110 in a directory. For a given user, such information can include, for example, a department of an organization to which the user belongs, a division of an organization to which the user belongs, the user's geographic region, the user's function or title, and/or the like. For illustrative purposes, examples may be provided herein with respect to ACTIVE DIRECTORY by MICROSOFT. However, it should be appreciated that the principles described herein are not so limited. Other directory services such as, for example, NOVELL eDirectory, RED HAT Directory Server, APPLE Open Directory, APACHE Directory Server, and/or the like can also be utilized.

The profiling system 112 includes a profiling engine 114, a profile data store 116, and an access module 118. In various embodiments, the profiling engine 114 is operable to discover controlling-user networks for users of the content-management system 110. In various embodiments, the controlling-user networks can be user-specific. For example, a controlling-user network for a given user can be based, at least in part, on sites on which the given user has permissions (e.g., as evidenced by an access control list). In various other embodiments, the controlling-user networks can be user-group specific. In some embodiments, a single, global controlling-user network can be established for the content-management system 110. Examples of discovering controlling-user networks will be described in greater detail with respect to FIGS. 3-5.

In certain embodiments, the profiling engine 114 can also generate profiles of controlling users of the content-management system 110. For example, the profiles can include information acquired from the administration system 124, the directory-services system 120, and/or the like. The profiles can be stored in the profile data store 116. The profile data store 116 can include, for example, one or more flat files, one or more relational databases, one or more non-relational databases, etc. Examples of profiles that the profiling engine 114 can generate will be described with respect to FIG. 6.

In various embodiments, the access module 118 is operable to expose the controlling-user networks to the users to which they correspond. For example, the access module 118 can provide an interface to the end-user information handling systems 108 that allows the profiled controlling users of the controlling-user network to be searched. Examples of searching the profiled controlling users will be described in greater detail with respect to FIGS. 7-9.

Figure 2:
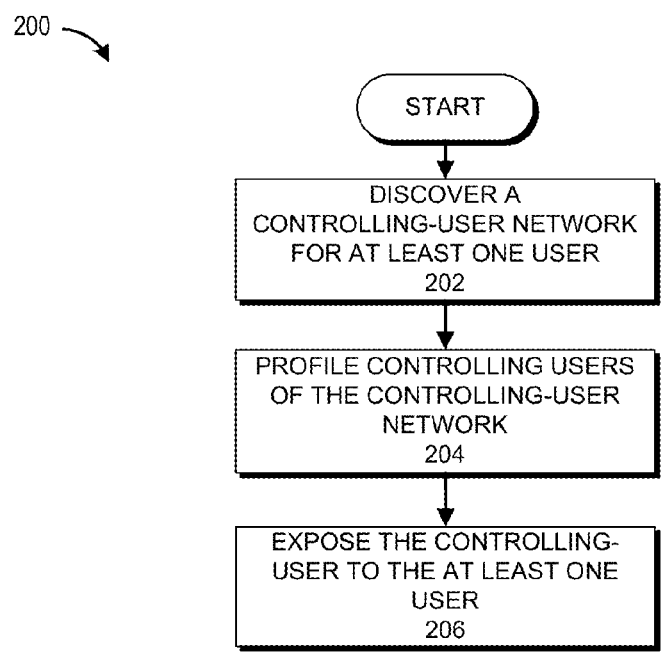
FIG. 2 illustrates an example of a process for facilitating controlling-user networks.

FIG. 2 illustrates an example of a process 200 for facilitating controlling-user networks. In some embodiments, the process 200 can be performed at certain intervals (e.g., daily, weekly, monthly) for certain users or controlling users of the content-management system 110 (e.g., all users, all controlling users, etc.). In other cases, the process 200, or certain blocks of the process 200, can be initiated on-demand by a user or controlling user. For example, via the access module 118, a user or controlling user can indicate a desire to connect with controlling users. Upon receipt of the indication, the profiling engine 114 can begin discovery as described with respect to block 202.

The process 200 can be implemented by any system that can access one or more data sources. For example, the process 200, in whole or in part, can be implemented by one or more of the front-end server farm 102, the one or more content databases 104, the administration system 124, the profiling engine 114, the access module 118, the profile data store 116, the directory-services system 120, and/or the end-user information handling systems 108. The process 200 can also be performed generally by the collaboration system 122 and/or the system 100. Although any number of systems, in whole or in part, can implement the process 200, to simplify discussion, the process 200 will be described in relation to specific components of the system 100.

At block 202, the profiling engine 114 discovers a controlling-user network for each of at least one user of the content-management system 110. In some embodiments, the at least one user can be a controlling user of one or more sites managed by the content-management system 110. In other embodiments, the at least one user can be any user of the content-management system, a user with sufficient permissions with respect to one or more sites managed by the content-management system 110, and/or the like. In some cases, the at least one user may be, for example, a registered user of the content-management system 110 who aspires to be a controlling user of a new site managed by the content-management system 110.

The discovery at the block 202 can include the content-management system determining which controlling users should be part of the controlling-user network for the at least one user. The discovery can be based, at least in part, on the at least one user's permissions with respect to sites managed by the content-management system 110. Examples of functionality that can be performed at the block 202 will be described in greater detail with respect to FIGS. 3-5. Information sufficient to identify the controlling-user network can be stored in the profile data store 116 or in memory.

At block 204, the profiling engine 114 profiles the controlling users of the discovered controlling-user network. In certain embodiments, the profiling can include acquiring information related to the controlling users from the administration system 124, the directory services-system 120, or another suitable information source and generating a profile containing all or part of the acquired information. For example, the block 204 can yield a profile for each controlling user of the discovered controlling-user network. In various embodiments, the profiling engine 114 can store each profile in the profile data store 116 or in memory. Examples of profiles that can result from the block 204 will be described with respect to FIG. 6.

At block 206, the access module 118 exposes the controlling-user network to the users to whom the network relates. For example, if the controlling-user network relates to a single user, the controlling-user network can be exposed to that user. By way of further example, if the controlling-user network relates to a group of users, for example, as defined by the directory-services system 120, the controlling-user network can be exposed to all users of the group.

In general, the controlling-user network can be exposed by providing an interface for accessing information related to the profiled controlling users of the controlling-user network. For example, the access module 118 can serve a searchable interface over the communications network 106 to the end-user information handling systems 108. Examples of functionality that can be included at the block 206 will be described in greater detail with respect to FIGS. 7-9.

It should be appreciated that, although the blocks 202-206 are described in a particular sequence for purposes of illustration, the particular sequence is not required. For example, in some embodiments, controlling users of the content-management system 110 can be profiled as described with respect to block 204 whether or not any controlling-user networks have been discovered. In these embodiments, if discovery as described with respect to the block 202 is later conducted, the profiles can be accessed from the profile data store 116 when the controlling-user networks are exposed as described with respect to the block 206. Other variations in the sequence of the process 200 will be apparent to one of ordinary skill in the art after reviewing the inventive principles contained herein.

Figure 3:
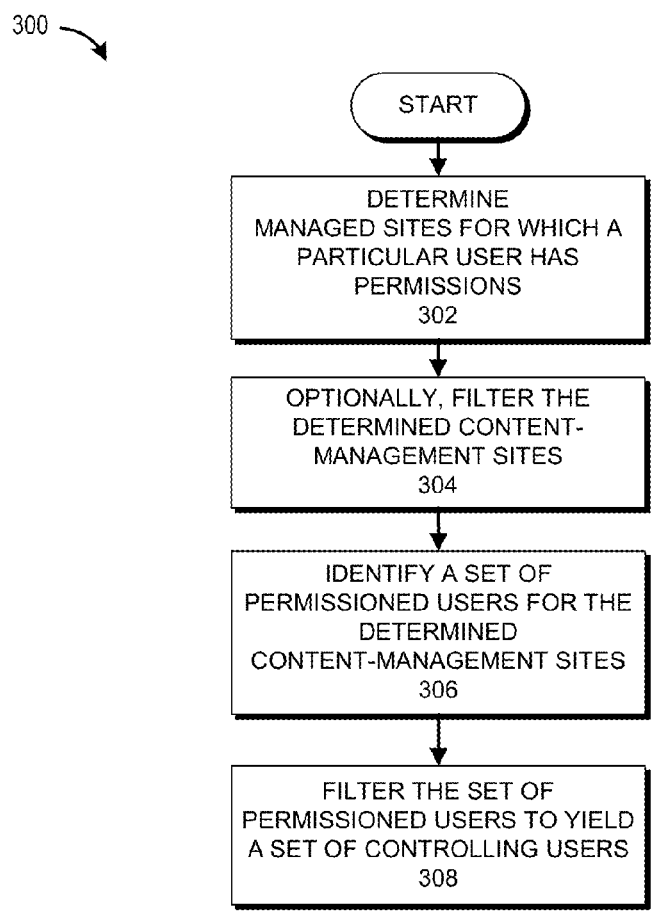
FIG. 3 illustrates an example of a process for discovering a controlling-user network.

FIG. 3 illustrates an example of a process 300 for discovering a controlling-user network. In some embodiments, the process 300 can be performed as all or part of the block 202 of the process 200 of FIG. 2. The process 300 can also be performed independently of the process 200.

The process 300 can be implemented by any system that can access one or more data sources. For example, the process 300, in whole or in part, can be implemented by one or more of the front-end server farm 102, the one or more content databases 104, the administration system 124, the profiling engine 114, the access module 118, the profile data store 116, the directory-services system 120, and/or the end-user information handling systems 108. The process 300 can also be performed generally by the collaboration system 122 and/or the system 100. Although any number of systems, in whole or in part, can implement the process 300, to simplify discussion, the process 300 will be described in relation to specific components of the system 100.

At block 302, the profiling engine 114 determines the managed sites of the content-management system 110 for which a particular user has any permissions (e.g., as indicated by an access control list). In various embodiments, the determination can be made from among all sites managed by the content-management system 110. In a typical embodiment, the block 302 yields a list that includes a network location (e.g., a uniform resource locator) of each such managed site for which the particular user has been granted any permissions. It should be appreciated that, depending on implementation, the managed sites may be organized into a hierarchy such that some managed sites are sub-sites of other managed sites. In many cases, permissions can vary among a given site and its sub-sites. An example of functionality that can be performed at the block 302 will be described with respect to FIG. 4.

At block 304, the profiling engine 114 can filter the determined sites. For example, the profiling engine 114 can filter the determined sites to remove those sites where the particular user is not a controlling user. In various embodiments, the block 304 can also be omitted so that no filtering of the determined sites is performed.

At block 306, the profiling engine 114 identifies a set of permissioned users for the determined sites. In a typical embodiment, the set of permissioned users are those users who have been granted any permissions with respect to any of the determined sites (e.g., as indicated by access control lists). The set of permission users can be identified through interaction with the administration system 124. Examples of functionality that can be performed at the block 306 will be described in greater detail with respect to FIG. 5.

At block 308, the profiling engine 114 filters the set of permissioned users to remove those users who are not a controlling user of at least one site of the content-management system 110. In this fashion, the block 308 yields a set of controlling users. The set of controlling users can be considered to collectively form a controlling-user network with respect to the particular user as described with respect to the block 202 of FIG. 2.

Figure 4:
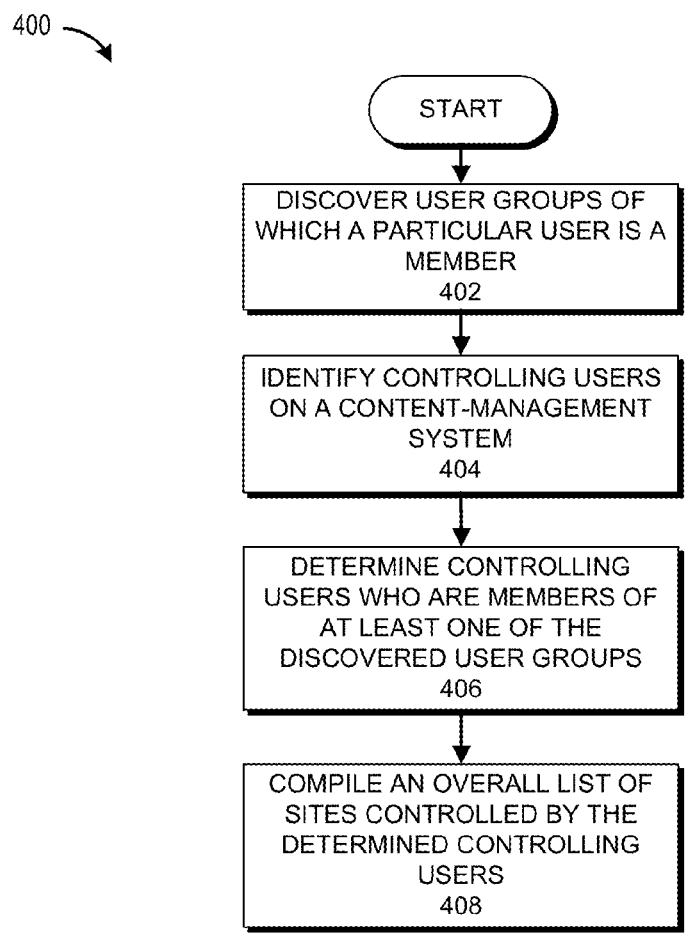
FIG. 4 illustrates an example of a process for determining the managed sites for which a particular user has at least minimal permissions.

FIG. 4 illustrates an example of a process 400 for determining the managed sites for which a particular user has been grated any permissions. In some embodiments, the process 400 can be performed as all or part of the block 302 of the process 300 of FIG. 3. The process 400 can also be performed independently of the process 300.

The process 400 can be implemented by any system that can access one or more data sources. For example, the process 400, in whole or in part, can be implemented by one or more of the front-end server farm 102, the one or more content databases 104, the administration system 124, the profiling engine 114, the access module 118, the profile data store 116, the directory-services system 120, and/or the end-user information handling systems 108. The process 400 can also be performed generally by the collaboration system 122 and/or the system 100. Although any number of systems, in whole or in part, can implement the process 400, to simplify discussion, the process 400 will be described in relation to specific components of the system 100.

At block 402, the profiling engine 114 discovers user groups of which the particular user is a member. In various embodiments, the user groups can be discovered by passing a user identifier such as, for example, a security identifier (SID), to the directory-services system 120. The directory-services system 120 can in turn return the user groups to the profiling engine 114. Each returned user group typically identifies, by a user identifier (e.g., SID), each user who is member of that user group.

At block 404, the profiling engine 114 identifies controlling users of the content-management system 110. For example, as part of the block 404, the profiling engine 114 can request and receive identification of the controlling users from the administrations system 124 of the content-management system 110. In a typical embodiment, the block 404 yields, for each site managed by the content-management system, a network location (e.g., URL) of the site, a user identifier (e.g., SID) of one or more controlling users of the site, and an access control list for the site. The access control list can specify, for example, which users have been granted which permissions on a given site.

At block 406, the profiling engine 114 determines which of the identified controlling users are members of at least one of the user groups discovered at block 404. At block 408, the profiling engine compiles a list of sites controlled by the determined controlling users from the block 406. The list can also include, for each site on the list, the network location of the site and the access control list as described with respect to the block 404. In a typical embodiment, the sites on the list can be considered to be those sites on which the particular user has been granted at least some permissions as described with respect to the block 302 of FIG. 3.

Figure 5:
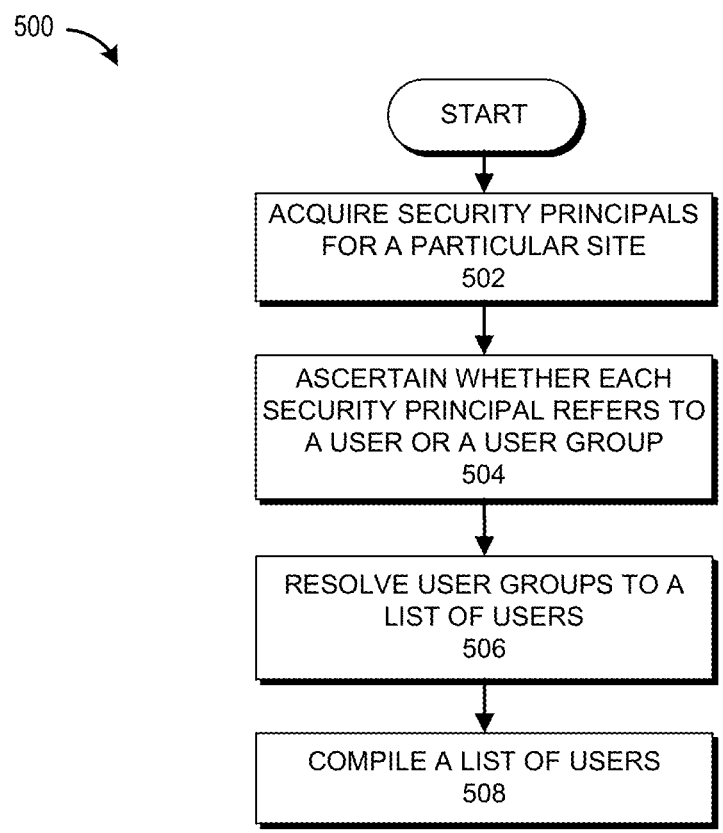
FIG. 5 illustrates an example of a process for identifying a set of permissioned users.

FIG. 5 illustrates an example of a process 500 for identifying a set of permissioned users for a particular site on a content-management system. In general, the set of permissioned users are those users who have been granted at least some permissions on the particular site. In some embodiments, the process 500 can be performed as all or part of the block 306 of the process 300 of FIG. 3. In these embodiments, the process 500 can be performed with respect to each determined site from the block 302 of FIG. 3. The process 500 can also be performed independently of the process 300.

The process 500 can be implemented by any system that can access one or more data sources. For example, the process 500, in whole or in part, can be implemented by one or more of the front-end server farm 102, the one or more content databases 104, the administration system 124, the profiling engine 114, the access module 118, the profile data store 116, the directory-services system 120, and/or the end-user information handling systems 108. The process 500 can also be performed generally by the collaboration system 122 and/or the system 100. Although any number of systems, in whole or in part, can implement the process 500, to simplify discussion, the process 500 will be described in relation to specific components of the system 100.

At block 502, the profiling engine 114 acquires a list of security principals for the particular site of the content-management system 110. In various embodiments, a security principal can be representative of either a user or group of users. The list can include an identifier such as, for example, an SID, with respect to each security principal. At block 504, the profiling engine 114 ascertains whether each security principal refers to a user or group of users. In various embodiments, each security principal can be determined to refer to a particular user or a particular group of users via interaction with the directory-services system 120.

At block 506, the profiling engine 114 resolves the ascertained user groups to a list of users. In certain embodiments, each user group can be reduced to individual users through a recursive process executed on the directory-services system 120. At block 508, the profiling engine 114 compiles an overall list of users. The overall list can be compiled by integrating the list of users from the block 506 and the security principals ascertained to refer to users at the block 504. In certain embodiments, the users on the compiled list can be considered to represent the set of permissioned users for the particular site.

Figure 6:
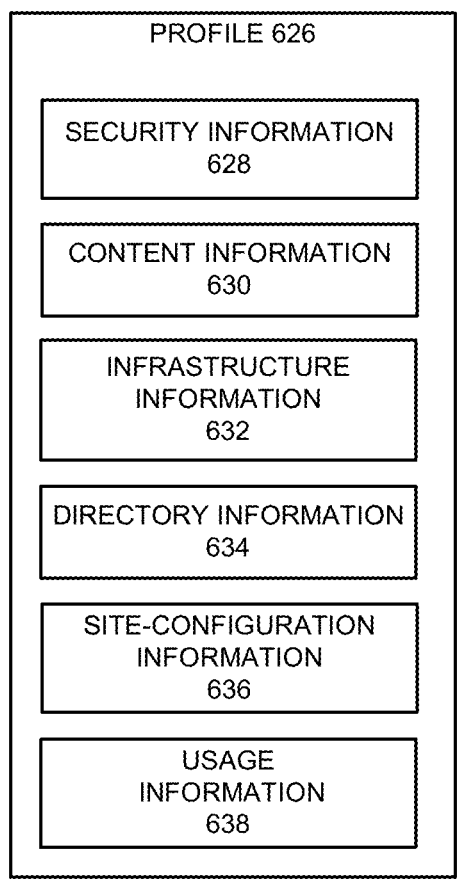
FIG. 6 illustrates an example of a profile that can be generated for a particular controlling user.

FIG. 6 illustrates an example of a profile 626 that can be generated for a particular controlling user. The profile 626 can be generated as described, for example, with respect to the block 204 of FIG. 2. For purposes of illustration, the profile 626 is shown to include security information 628, content information 630, infrastructure information 632, directory information 634, and site-configuration information 636, and usage information 638. It should be appreciated that the profile 626 can include more, less, or different information.

The security information 628 can include, for example, information related to users who have been granted at least some permissions on each of the particular controlling user's sites. For example, the security information 628 can include a list of users who can access the particular controlling user's sites. In various embodiments, the security information 628 can be acquired from access control lists provided by the administration system 124 of FIG. 1.

The content information 630 can include information related to content provided on the particular controlling user's sites. For example, the content information 630 can identify each type of content (e.g., document, presentation, etc.), content age, content version, etc. The content information 630 can also include information related to a content classification as described with respect to U.S. patent application Ser. No. 13/906,241, which application is hereby incorporated by reference. By way of further example, the content information 630 can include statistical or aggregate information for any of the examples provided above.

The infrastructure information 632 can include information related to a combined set of hardware, software, networks, facilities, including all of the information technology, in order to develop, test, deliver, monitor, control or support the particular controlling user's sites. In various embodiments, the infrastructure information can be acquired from the administration system 124.

The directory information 634 can include information related to a department of an organization to which the particular controlling user belongs, a division of an organization to which the particular controlling user belongs, the particular controlling user's geographic region, the particular controlling user's function or title, and/or the like. In a typical embodiment, the directory information 634 can be obtained from the directory-services system 120 of FIG. 1.

The site-configuration information 636 can include, for example, information related to widgets and widget customizations used on the controlling user's sites. Examples of the information related to widgets and widget customizations are described in U.S. patent application Ser. No. 13/739,731, which application is hereby incorporated by reference. The site-configuration information 636 can be requested and received, for example, form the administration system 124 of the content-management system 110.

The usage information 638 can include information related to activities of the particular controlling user and activities of other users on the particular controlling user's sites. For example, the usage information 638 can include information related to a level of participation by the particular controlling user and/or by other users on the particular controlling user's sites. By way of further example, the usage information 638 can include information related to page views for the particular controlling user's sites. In certain embodiments, the usage information 638 can be acquired from the administration system 124 of the content-management system 110.

Figure 7:
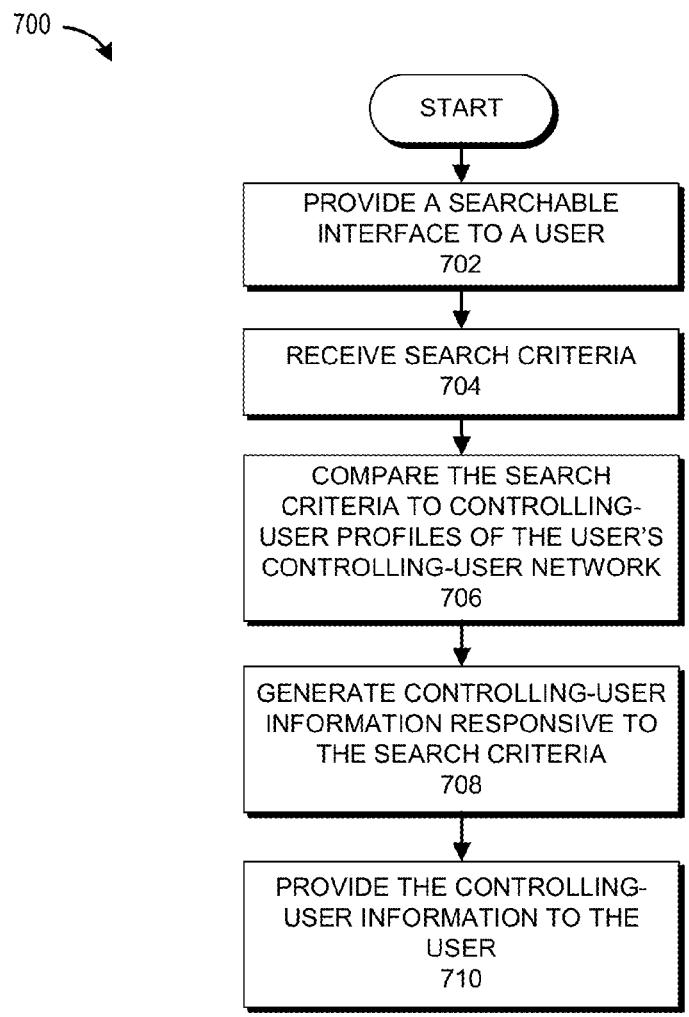
FIG. 7 illustrates an example of a process for exposing a controlling-user network to a particular user.

FIG. 7 illustrates an example of a process 700 for exposing a controlling-user network to a particular user. In some embodiments, the process 700 can be performed as all or part of the block 206 of the process 200 of FIG. 2. The process 700 can also be performed independently of the process 200.

The process 700 can be implemented by any system that can access one or more data sources. For example, the process 700, in whole or in part, can be implemented by one or more of the front-end server farm 102, the one or more content databases 104, the administration system 124, the profiling engine 114, the access module 118, the profile data store 116, the directory-services system 120, and/or the end-user information handling systems 108. The process 700 can also be performed generally by the collaboration system 122 and/or the system 100. Although any number of systems, in whole or in part, can implement the process 700, to simplify discussion, the process 700 will be described in relation to specific components of the system 100.

At block 702, the access module 118 provides a searchable interface to the particular user. For example, in various embodiments, the searchable interface permits the particular user to enter search criteria. The search criteria can specify, for example, any information that is included in a profile such as the profile 626 of FIG. 6.

At block 704, the access module 118 receives the search criteria. At block 706, the access module 118 compares the search criteria to controlling-user profiles for controlling users that are in a controlling-user network corresponding to the particular user. In various embodiments, information sufficient to identify the controlling-user network and the controlling-user profiles can be retrieved from the profile data store 116.

At block 708, the access module generates controlling-user information responsive to the search criteria. For example, the access module 118 can determine a likelihood of suitability between the particular user and each of the controlling users of the controlling-user network. In various embodiments, the access module 118 can perform a Gaussian process for establishing optimal suitability. In certain embodiments, the controlling-user information can include list of most-suitable controlling users given the search criteria.

At block 710, the controlling-user information is presented to the particular user. For example, the controlling-user information can be served over the communications network 106 to an end-user information handling system of the end-user information handling systems 108 that is operated by the particular user. Thereafter, the particular user can be permitted to contact or connect with the controlling users that are identified in the controlling-user information. In some cases, the access module 118 can provide contact information for the controlling users. In addition, in various embodiments, the particular user can be permitted to contact, collaborate, or interact with the controlling users in ways similar to those described with respect to subject-matter experts in Ser. No. 14/047,162, which application is hereby incorporated by reference.

Figure 8:
FIG. 8 illustrates an example of a searchable interface.

FIG. 8 illustrates an example of a searchable interface 800. In various embodiments, a searchable interface similar to the searchable interface 800 can be presented to a user, for example, as part of the block 702 of FIG. 7.

FIG. 9 illustrates an example of a search-results interface 900. In various embodiments, a search-results interface similar to the search-results interface 900 can be presented to a user as part of the block 710 of FIG. 7.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method of discovering a user-specific controlling-user network for a particular user of a content-management system, the content-management system comprising a plurality of managed sites, the user-specific controlling-user network comprising a plurality of controlling users of the content-management system, the method comprising, by a computer system:

passing a security identifier of the particular user to a directory-services system;

responsive to the passing, receiving, from the directory-services system, user groups of which the particular user is a member;

requesting, from an administrative system, security identifiers of controlling users of the plurality of managed sites of the content-management system, network locations of the plurality of managed sites and access control lists for the plurality of managed sites, wherein the controlling users represent specific users who are primarily responsible for the plurality of managed sites of the content-management system;

responsive to the requesting, receiving, from the administrative system, the security identifiers of the controlling users of the plurality of managed sites of the content-management system, the network locations of the plurality of managed sites and the access control lists for the plurality of managed sites;

determining, via the security identifiers of the controlling users, which of the controlling users are members of at least one of the user groups of which the particular user is a member;

compiling information related to managed sites of the content-management system that are controlled by the determined controlling users, the compiled information comprising, for each managed site that is controlled by a controlling user of the determined controlling users, the network location of the managed site and the access control list of the managed site;

acquiring, via the access control lists in the compiled information, security principals of the managed sites that are controlled by the determined controlling users;

ascertaining whether each of the security principals refers to a user or a group of users;

resolving each said security principal that refers to a group of users to individual users;

integrating each said security principal that refers to a user and the individual users of each said resolved security principal into a set of permissioned users who have been granted access to one or more of the managed sites that are controlled by the determined controlling users; and removing from the set of permissioned users those users who are not a controlling user of at least one managed site of the content-management system, the removing yielding the plurality of controlling users of the user-specific controlling-user network.

2. The method of claim 1 comprising, prior to the acquiring, removing from the compiled information those managed sites for which the particular user is not a controlling user.

3. The method of claim 1, comprising:
generating one or more profiles of the plurality of controlling users based, at least in part, on information gleaned from sites on the content-management system controlled by the plurality of controlling users; and
exposing the user-specific controlling-user network to the particular user using a result of the generating.

4. The method of claim 3, wherein the generating comprises generating a plurality of controlling-user profiles corresponding to the plurality of controlling users.

5. The method of claim 4, wherein each controlling-user profile comprises information selected from the group consisting of: security information, content information, infrastructure information, directory information, and site-configuration information.

6. The method of claim 4, wherein the exposing comprises:
providing a searchable interface to the particular user;
receiving search criteria;
comparing the search criteria to the plurality of controlling-user profiles;
generating controlling-user information responsive to the search criteria; and
providing the controlling-user information to the particular user.

7. The method of claim 6, wherein the controlling-user information comprises a list of controlling users.

8. The method of claim 7, comprising allowing the particular user to contact one or more controlling users on the list of controlling users.

9. An information handling system comprising a computer processor and memory, wherein the computer processor and memory in combination are operable to implement a method of discovering a user-specific controlling-user network for a particular user of a content-management system, the content-management system comprising a plurality of managed sites, the user-specific controlling-user network comprising a plurality of controlling users of the content-management system, the method comprising:
passing a security identifier of the particular user to a directory-services system;
responsive to the passing, receiving, from the directory-services system, user groups of which the particular user is a member;
requesting, from an administrative system, security identifiers of controlling users of the plurality of managed sites of the content-management system, network locations of the plurality of managed sites and access control lists for the plurality of managed sites, wherein the controlling users represent specific users who are primarily responsible for the plurality of managed sites of the content-management system;
responsive to the requesting, receiving, from the administrative system, the security identifiers of the controlling users of the plurality of managed sites of the content-management system, the network locations of the plurality of managed sites and the access control lists for the plurality of managed sites;
determining, via the security identifiers of the controlling users, which of the controlling users are members of at least one of the user groups of which the particular user is a member;
compiling information related to managed sites of the content-management system that are controlled by the determined controlling users, the compiled information comprising, for each managed site that is controlled by a controlling user of the determined controlling users, the network location of the managed site and the access control list of the managed site;
acquiring, via the access control lists in the compiled information, security principals of the managed sites that are controlled by the determined controlling users;
ascertaining whether each of the security principals refers to a user or a group of users;
resolving each said security principal that refers to a group of users to individual users;
integrating each said security principal that refers to a user and the individual users of each said resolved security principal into a set of permissioned users who have been granted access to one or more of the managed sites that are controlled by the determined controlling users; and
removing from the set of permissioned users those users who are not a controlling user of at least one managed site of the content-management system, the removing yielding the plurality of controlling users of the user-specific controlling-user network.

10. The information handling system of claim 9, the method comprising, prior to the acquiring, removing from the compiled information those managed sites for which the particular user is not a controlling user.

11. The information handling system of claim 9, the method comprising:

generating one or more profiles of the plurality of controlling users based, at least in part, on information gleaned from sites on the content-management system controlled by the plurality of controlling users; and exposing the user-specific controlling-user network to the particular user using a result of the generating.

12. The information handling system of claim 11, wherein the generating comprises generating a plurality of controlling-user profiles corresponding to the plurality of controlling users.

13. The information handling system of claim 12, wherein the exposing comprises:

providing a searchable interface to the particular user;

receiving search criteria;

comparing the search criteria to the plurality of controlling-user profiles;

generating controlling-user information responsive to the search criteria; and providing the controlling-user information to the particular user.

14. The information handling system of claim 13, wherein the controlling-user information comprises a list of controlling users.

15. The information handling system of claim 14, the method comprising allowing the particular user to contact one or more controlling users on the list of controlling users.

16. A computer-program product comprising a non-transitory computer-usable medium having computer-readable program code embodied therein, the computer-readable program code adapted to be executed to implement a method of discovering a user-specific controlling-user network for a particular user of a content-management system, the content-management system comprising a plurality of managed sites, the user-specific controlling-user network comprising a plurality of controlling users of the content-management system, the method comprising:

passing a security identifier of the particular user to a directory-services system;

responsive to the passing, receiving, from the directory-services system, user groups of which the particular user is a member;

requesting, from an administrative system, security identifiers of controlling users of the plurality of managed sites of the content-management system, network locations of the plurality of managed sites and access control lists for the plurality of managed sites, wherein the controlling users represent specific users who are primarily responsible for the plurality of managed sites of the content-management system;

responsive to the requesting, receiving, from the administrative system, the security identifiers of the controlling users of the plurality of managed sites of the content-management system, the network locations of the plurality of managed sites and the access control lists for the plurality of managed sites;

determining, via the security identifiers of the controlling users, which of the controlling users are members of at least one of the user groups of which the particular user is a member;

compiling information related to managed sites of the content-management system that are controlled by the determined controlling users, the compiled information comprising, for each managed site that is controlled by a controlling user of the determined controlling users, the network location of the managed site and the access control list of the managed site;

acquiring, via the access control lists in the compiled information, security principals of the managed sites that are controlled by the determined controlling users;

ascertaining whether each of the security principals refers to a user or a group of users;

resolving each said security principal that refers to a group of users to individual users;

integrating each said security principal that refers to a user and the individual users of each said resolved security principal into a set of permissioned users who have been granted access to one or more of the managed sites that are controlled by the determined controlling users; and removing from the set of permissioned users those users who are not a controlling user of at least one managed site of the content-management system, the removing yielding the plurality of controlling users of the user-specific controlling-user network.

\* \* \* \* \*